United States Patent
Ji et al.

(10) Patent No.: US 9,813,954 B2
(45) Date of Patent: Nov. 7, 2017

(54) METHOD FOR DETERMINING UNNECESSARY HANDOVER AND BASE STATION

(71) Applicant: Huawei Technologies Co., Ltd., Shenzhen, Guangdong (CN)

(72) Inventors: Li Ji, Shanghai (CN); Henrik Olofsson, Kista (SE); Jun Wang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 241 days.

(21) Appl. No.: 14/550,354

(22) Filed: Nov. 21, 2014

(65) Prior Publication Data

US 2015/0079994 A1    Mar. 19, 2015

Related U.S. Application Data

(63) Continuation of application No. PCT/CN2013/072785, filed on Mar. 18, 2013.

(30) Foreign Application Priority Data

May 23, 2012   (CN) .......................... 2012 1 0161669

(51) Int. Cl.
*H04W 36/00* (2009.01)
*H04W 24/02* (2009.01)
(Continued)

(52) U.S. Cl.
CPC ....... *H04W 36/0083* (2013.01); *H04W 24/02* (2013.01); *H04W 36/0061* (2013.01); *H04W 36/08* (2013.01); *H04W 36/32* (2013.01)

(58) Field of Classification Search
CPC ............... H04W 36/66; H04W 36/245; H04W 36/0083; H04W 36/08; H04W 36/30;
(Continued)

(56) References Cited

U.S. PATENT DOCUMENTS 6,754,494 B1   6/2004  Yoshimura
6,760,596 B1   7/2004  Fiorini et al.
(Continued)

FOREIGN PATENT DOCUMENTS

CN    1870602 A    11/2006
CN    101047952 A   10/2007
(Continued)

*Primary Examiner* — Olumide T Ajibade Akonai

(57) ABSTRACT

The present invention provides a method for determining an unnecessary handover and a base station. The method includes: if a user equipment UE is handed over from a first cell to a second cell, and then handed over from the second cell to a third cell, determining, by a base station, a time threshold corresponding to a UE characteristic attribute parameter of the UE, and a time of stay of the UE in the second cell; determining, by the base station according to the time threshold corresponding to a UE characteristic attribute and the time of stay of the UE in the second cell that are determined, whether an unnecessary handover of the UE occurs; and determining that an unnecessary handover of the UE occurs if the time of stay is shorter than the time threshold. The present invention optimizes a method for determining whether an unnecessary handover occurs.

14 Claims, 6 Drawing Sheets

(51) Int. Cl.
*H04W 36/32* (2009.01)
*H04W 36/08* (2009.01)

(58) Field of Classification Search
CPC . H04W 24/02; H04W 36/32; H04W 36/0061; H04W 36/24; H04W 48/20; H04W 36/165
USPC .................................................. 455/436–444
See application file for complete search history.

(56) References Cited

U.S. PATENT DOCUMENTS

| | | |
|---|---|---|
| 6,944,144 B2 | 9/2005 | Guo et al. |
| 6,982,949 B2 | 1/2006 | Guo et al. |
| 7,197,318 B2 | 3/2007 | Schwarz et al. |
| 7,426,178 B2 | 9/2008 | Guo et al. |
| 7,499,432 B2 | 3/2009 | Guo et al. |
| 8,059,597 B2 | 11/2011 | Park et al. |
| 2006/0166677 A1 | 7/2006 | Derakshan et al. |
| 2009/0163223 A1 | 6/2009 | Casey |
| 2010/0130211 A1 | 5/2010 | Bae et al. |
| 2010/0178922 A1 | 7/2010 | Han et al. |
| 2012/0083262 A1* | 4/2012 | Dimou .............. H04W 36/0055 455/423 |
| 2015/0304907 A1* | 10/2015 | Centonza .......... H04W 36/0066 455/436 |

FOREIGN PATENT DOCUMENTS

| | | |
|---|---|---|
| CN | 102196485 A | 9/2011 |
| KR | 20100084213 A | 7/2010 |
| WO | WO 2010/124461 A1 | 11/2010 |

\* cited by examiner

METHOD FOR DETERMINING UNNECESSARY HANDOVER AND BASE STATION

CROSS-REFERENCE TO RELATED APPLICATIONS

This application is a continuation of International Application No. PCT/CN2013/072785, filed on Mar. 18, 2013, which claims priority to Chinese Patent Application No. 201210161669.X, filed on May 23, 2012, both of which are hereby incorporated by reference in their entireties.

TECHNICAL FIELD

The present invention relates to the radio communications field, and in particular, to a method for determining an unnecessary handover and a base station.

BACKGROUND

In the 3rd Generation Partnership Project (3GPP), a base station delivers a measurement configuration message to a user equipment (UE) that the base station serves, to instruct the UE to measure signal quality of a source cell and a neighboring cell of the source cell. When the signal quality of the neighboring cell meets a handover condition, the UE reports a measurement result to a source base station. The source base station determines whether to perform a handover according to the measurement report reported by the UE. In some cases, for example, when the UE is at a relatively fast speed, the UE passes a cell edge, or the like, the UE may be handed over from cell 1 to cell 2, stay in cell 2 for a relatively short time and then be handed over again to a cell 3.

In the prior art, a fixed time threshold is configured, on a base station, for all services and UEs, and the time threshold is referred to as a default time threshold, which is used to determine length of a time of stay of a UE in a cell. In the foregoing case in which the UE is handed over from cell 1 to cell 2, stays in cell 2 for a relatively short time, and is handed over again to cell 3, when a time of stay of the UE in cell 2 is shorter than the foregoing fixed time threshold, the handover is referred to as a fast handover. When the case, in which the UE is handed over from cell 1 to cell 2, stays in cell 2 for a time shorter than the configured fixed time threshold, and is handed over again to cell 3, occurs, the handover from cell 1 to cell 2 is considered an unnecessary handover in the prior art. In the prior art, if the number of unnecessary handovers reaches a certain value, a handover parameter needs to be adjusted according to collected unnecessary handover cases, so that the UE is directly handed over from cell 1 to cell 3.

A possible cause of the unnecessary handover is that an improper handover parameter is configured on a base station to which cell 1 belongs; therefore, the base station may determine whether an unnecessary handover occurs according to the default time threshold. If the time of stay in cell 2 is shorter than the default time threshold, it is determined that an unnecessary handover occurs. A base station, to which a cell where the unnecessary handover is discovered (that is, cell 2) belongs, sends a notification message to a base station to which a cell where the unnecessary handover is triggered (that is, cell 1) belongs, so as to notify the base station to which the cell 1 belongs that an unnecessary handover of the UE occurs. In this way, the base station to which cell 1 belongs performs subsequent parameter optimization according to the collected unnecessary handover cases to reduce unnecessary handovers, thereby reducing signaling overhead caused by unnecessary handovers.

In the prior art, however, a problem that a performance penalty is caused due to an improper method of determining an unnecessary handover exists; therefore, an optimized method for determining an unnecessary handover is required.

SUMMARY

The present invention provides a method for determining an unnecessary handover and a base station, so as to solve a problem of how to optimize a method for determining whether an unnecessary handover occurs.

According to one aspect of the present invention, a method for determining an unnecessary handover is provided and includes:

if a user equipment UE is handed over from a first cell to a second cell and then handed over from the second cell to a third cell, determining, by a base station, a time threshold corresponding to a UE characteristic attribute parameter of the UE, and a time of stay of the UE in the second cell;

determining, by the base station according to the time threshold corresponding to a UE characteristic attribute and the time of stay of the UE in the second cell that are determined, whether an unnecessary handover of the UE occurs; and determining that an unnecessary handover of the UE occurs if the time of stay is shorter than the time threshold.

According to another aspect of the present invention, a base station is provided and includes:

a determining module, configured to determine, if a user equipment UE is handed over from a first cell to a second cell and then handed over from the second cell to a third cell, a time threshold corresponding to a UE characteristic attribute parameter of the UE, and a time of stay of the UE in the second cell; and a processing module, configured to determine whether an unnecessary handover of the UE occurs according to the time threshold corresponding to a UE characteristic attribute and the time of stay of the UE in the second cell, which are determined by the determining module; and determine that an unnecessary handover of the UE occurs if the time of stay is shorter than the time threshold.

According to another aspect of the present invention, a method for determining an unnecessary handover is provided and includes:

handing over, by a first base station, a user equipment UE from a first cell of the first base station to a second cell of a second base station; and if the UE is handed over from the second cell to a third cell, receiving, by the first base station, a notification of occurrence of an unnecessary handover sent to the first base station by the second base station or a third base station to which the third cell belongs, where the notification is sent by the second base station or the third base station when a time of stay of the UE in the second cell is shorter than a time threshold corresponding to a UE characteristic attribute parameter of the UE.

According to another aspect of the present invention, a base station is provided and includes:

a processing module, configured to hand over a user equipment UE from a first cell to a second cell; and a receiving module, configured to receive, if the UE is handed over from the second cell to a third cell, a notification of occurrence of an unnecessary handover sent by a third base station to which the second cell belongs or a base station to which the third cell belongs, where the notification is sent by the base station to which the third cell belongs or the base station to which the third cell belongs when a time of stay of the UE in the second cell is shorter than a time threshold corresponding to a UE characteristic attribute parameter of the UE.

The present invention enables a base station to determine whether an unnecessary handover occurs according to different time thresholds corresponding to different UE characteristic attribute parameters, so as to distinguish different UE characteristic attribute parameters when determining whether an unnecessary handover of a UE occurs, thereby optimizing a method for determining an unnecessary handover.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments, and persons skilled in the art may still derive other drawings from these accompanying drawings. It should be noted that, a dotted line in the drawings indicate that a corresponding step or module is optional.

DETAILED DESCRIPTION

Figure 1:
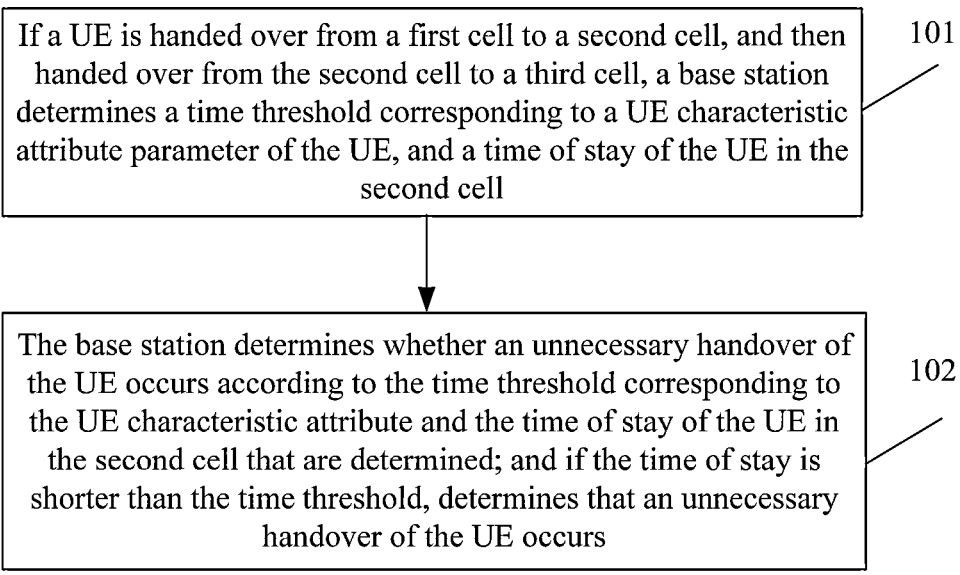
FIG. 1 is a schematic flowchart of a method for determining an unnecessary handover according to Embodiment 1 of the present invention.

In the prior art, insufficient amount of information exchanged may cause an improper handover parameter to be configured on a base station, which leads to an unnecessary handover, thereby causing some performance penalty problems. For example, in the prior art, a base station determines whether an unnecessary handover of a UE occurs according to a time of stay (TOS) and a configured fixed time threshold, where the fixed time threshold is the same for all services and UEs. If an unnecessary handover of a UE occurs, a base station, which learns the unnecessary handover of the UE after determining, sends a notification message to a base station that triggers the unnecessary handover, so as to notify the base station that triggers the unnecessary handover of the unnecessary handover of the UE. After receiving the notification message, the base station that triggers the unnecessary handover may adjust a handover parameter according to collected unnecessary handover cases to reduce unnecessary handovers. Therefore, in the prior art, whether an unnecessary handover occurs is determined only according to a time of stay and a fixed time threshold that is the same for all services and UEs, without considering other factors.

However, because different services or different UEs, or both may have different requirements, if services and UEs are not differentiated at the time of determining whether a fast handover occurs and the determining is performed based on a fixed time threshold that is the same for all services and UEs, it is possible that requirements of different services or different UEs or both may not be satisfied. In addition, the base station that triggers the unnecessary handover counts the number of these unnecessary handovers, and adjusts a handover parameter according to a counting result, thereby causing deterioration of experience of a UE user.

Based on the foregoing problem, embodiments of the present invention propose that, if one or more UE characteristic attribute parameters can be considered together in determining whether an unnecessary handover occurs, a method for determining whether an unnecessary handover occurs can be further optimized to improve experience of a UE user. Therefore, in the embodiments of the present invention, whether an unnecessary handover occurs may be determined according to a time threshold corresponding to a UE characteristic attribute parameter, instead of determining whether an unnecessary handover occurs according to a fixed time threshold that is the same for all scenarios; that is, in the embodiments of the present invention, whether an unnecessary handover occurs is not determined according to a fixed time threshold that is the same for all services and UEs.

The following clearly describes the technical solutions in the embodiments of the present invention with reference to the accompanying drawings. Apparently, the described embodiments are merely a part rather than all of the embodiments of the present invention. All other embodiments obtained by persons skilled in the art based on the embodiments of the present invention shall fall within the protection scope of the present invention.

It should be noted that, an embodiment of the present invention and a characteristic of an embodiment may be combined with each other arbitrarily in a case without a conflict.

Embodiment 1

Embodiment 1 of the present invention provides a method for determining an unnecessary handover. As shown in FIG. 1, the method includes the following steps:

Step 101: If a user equipment UE is handed over from a first cell to a second cell, and then handed over from the second cell to a third cell, a base station determines a time threshold corresponding to a UE characteristic attribute parameter of the UE, and a time of stay of the UE in the second cell.

In this embodiment, different UE characteristic attribute parameters correspond to different time thresholds. A UE characteristic attribute parameter and a time threshold may be in multiple correspondences, for example, one or more UE characteristic attribute parameters correspond to one time threshold. A correspondence in the following is the same and is not repeatedly described.

That a base station determines a time threshold corresponding to a UE characteristic attribute parameter of the UE may include the following: The base station determines the UE characteristic attribute parameter of the UE and determines the time threshold according to the determined UE characteristic attribute parameter and a correspondence between a UE characteristic attribute parameter and a time threshold, The base station itself may determine a UE characteristic attribute parameter.

The correspondence is a correspondence preset on the base station; or

Before the base station determines the time threshold corresponding to the UE characteristic attribute parameter of the UE, the method may include the following: The base station receives the correspondence between a UE characteristic attribute parameter and a time threshold.

In an implementation manner of this embodiment, the base station may be a base station to which the second cell belongs; and that the base station receives the correspondence between a UE characteristic attribute parameter and a time threshold may include the following: The base station to which the second cell belongs may receive the correspondence from a base station that triggers the unnecessary handover and that the first cell belongs to; or the base station to which the second cell belongs may receive the correspondence from an upper-layer entity that controls the base station to which the second cell belongs; or the base station may be a base station to which the third cell belongs; and that the base station receives the correspondence between a UE characteristic attribute parameter and a time threshold may include the following: The base station to which the third cell belongs may receive the correspondence from a base station to which the first cell belongs by using a base station to which the second cell belongs; or the base station to which the third cell belongs may receive the correspondence from an upper-layer entity that controls the base station to which the third cell belongs.

In this embodiment, after the base station receives the correspondence between a UE characteristic attribute parameter and a time threshold, the method may further include the following: The base station stores the received correspondence between a UE characteristic attribute parameter and a time threshold.

In the foregoing implementation manner, that the base station to which the second cell belongs may receive the correspondence from a base station to which the first cell belongs may include the following: The base station to which the second cell belongs receives the correspondence sent by the base station to which the first cell belongs by using a handover request message; or That the base station to which the third cell belongs receives the correspondence from a base station to which the first cell belongs by using a base station to which the second cell belongs includes the following: The base station to which the third cell belongs receives the correspondence sent by the base station to which the second cell belongs by using a handover request message, where the correspondence is acquired by the base station to which the second cell belongs from the base station to which the first cell belongs.

The correspondence may be carried in UE history information of the handover request message.

Therefore, a correspondence between a UE characteristic attribute parameter and a time threshold may be received by a base station and stored in the base station in advance, may be received by an upper-level entity of the base station and stored in the base station, and may also be preset by an operator on the base station, and the like.

Certainly, the base station may also receive the correspondence in another manner, for example, by using an interface between base stations, which is not limited thereto in the embodiments of the present invention.

It should be noted that, this step is not limited to the foregoing implementation manner, and may also be implemented in another manner. For example, in a case in which a base station determines whether an unnecessary handover occurs only for UEs of a certain type, that a base station determines a time threshold corresponding to a UE characteristic attribute parameter may include the following: The base station receives a time threshold corresponding to a UE characteristic attribute parameter, or the base station pre-stores a time threshold corresponding to a UE characteristic attribute parameter, or the like. An implementation manner in the following embodiments is similar and is not repeatedly described.

Step 102: The base station determines whether an unnecessary handover of the UE occurs according to the time threshold corresponding to the UE characteristic attribute and the time of stay of the UE in the second cell that are determined; and if the time of stay is shorter than the time threshold, determines that an unnecessary handover of the UE occurs.

In another implementation manner of this embodiment, the base station is a base station to which the first cell belongs.

Before the base station determines the time threshold corresponding to the UE characteristic attribute parameter, the method further includes the following: The base station to which the first cell belongs receives related information sent to the base station to which the first cell belongs by a base station to which the second cell belongs or a base station to which the third cell belongs, where the related information includes a time of stay of the UE in the second cell and the UE characteristic attribute parameter of the UE; and the related info/Ration is sent by the base station to which the second cell belongs or the base station to which the third cell belongs when the time of stay of the UE in the second cell is shorter than a default time threshold.

When the base station determines the time threshold corresponding to the UE characteristic attribute parameter, the base station to which the first cell belongs determines the time threshold corresponding to the UE characteristic attribute parameter according to the UE characteristic attribute parameter included in the related information.

When the base station determines whether an unnecessary handover of the UE occurs, the base station to which the first cell belongs determines whether an unnecessary handover of the UE occurs according to the time of stay included in the related information and the determined time threshold.

That the base station to which the first cell belongs determines the time threshold corresponding to the UE characteristic attribute parameter according to the UE characteristic attribute parameter included in the related information includes the following:

The base station to which the first cell belongs determines the time threshold corresponding to the UE characteristic attribute parameter that is included in the related information according to a pre-stored correspondence between a UE characteristic attribute parameter and a time threshold; or the base station to which the first cell belongs receives, from an upper-level entity of the base station to which the first cell belongs, a correspondence between a UE characteristic attribute parameter and a time threshold, and determines the time threshold corresponding to the UE characteristic attribute parameter that is included in the related information according to the received correspondence.

After it is determined that an unnecessary handover of the UE occurs, the method further includes the following:

The base station to which the first cell belongs counts unnecessary handovers in an ascending manner, and if the number of the unnecessary handovers within a period exceeds a count threshold, the base station to which the first cell belongs adjusts a handover parameter to reduce the unnecessary handovers; or the base station to which the first cell belongs counts unnecessary handovers in a descending manner, and if the number of the unnecessary handovers within a period is lower than a count threshold, the base station to which the first cell belongs adjusts a handover parameter to reduce occurrence of the unnecessary handovers.

In this embodiment, a UE characteristic attribute parameter includes one or more of a service type, a quality of service (QoS) requirement of a service, and a subscriber profile ID (SPID) of a UE.

The embodiment of the present invention enables a base station to determine whether an unnecessary handover of a UE occurs according to a time threshold corresponding to a UE characteristic attribute parameter, so as to distinguish different UE characteristic attribute parameters when determining whether an unnecessary handover of a UE occurs, thereby optimizing a method for determining an unnecessary handover.

Preferably, if a second base station performs determining according to a time of stay of a UE in a second cell, in an implementation manner of step 101, the second base station may receive the correspondence from a first base station by using a handover request message that carries the correspondence, and at this time, the correspondence is parallel with UE history information instead of being carried in the UE history information; or the second base station may receive the correspondence from a first base station by using UE history information, which carries the correspondence, of a handover request message, and at this time, the correspondence is carried in the UE history information.

Preferably, when a third base station performs determining according to a time of stay of a UE in a second cell, the third base station may receive the correspondence from a second base station by using UE history information, which carries the correspondence, of a handover request message, and at this time, the correspondence is carried in the UE history information.

In the foregoing embodiment, a time threshold corresponding to a UE characteristic attribute parameter may be determined by an operator according to its own requirement, and the operator may also define different time thresholds for different UE characteristic attribute parameters by combining service types or different UE service requirements or both or the like, and configure the correspondence between a UE characteristic attribute parameter and a time threshold or a time threshold for a base station, where the time threshold may be an empirical value or be set according to a requirement. A setting manner of the time threshold is not limited in the embodiments of the present invention as long as the time threshold is related to a UE characteristic attribute parameter. For example:

A throughput requirement of a File Transfer Protocol (FTP) service is high, and this type of service requires an optimal cell to be traced all the time and multiple handovers to be allowed. Therefore, for this type of service, whether an unnecessary handover occurs may be determined according to a relatively low time threshold, for example 1s, related to this type of service. If a time of stay of a UE in a certain cell is shorter than the time threshold 1 s corresponding to the FTP service, then it is determined that an unnecessary handover of the UE occurs.

For another example, a voice service has a strict requirement for time delay. Therefore, this type of service requires connection to be maintained and multiple handovers to be reduced, and thereby a time delay caused by multiple handovers is reduced. Therefore, for this type of service, whether an unnecessary handover occurs may be determined according to a relatively high threshold, for example 2s, related to this type of service. If a time of stay of a UE in a certain cell is shorter than the time threshold 2 s corresponding to the voice service, then it is determined that an unnecessary handover of the UE occurs.

For still another example, an SPID indicates a frequency or a radio access technology (RAT), where the frequency or radio access technology is required to be used when a UE is handed over, and a base station needs to hand over the UE according to the SPID. In this embodiment of the present invention, a time threshold corresponding to the SPID may be set for this type of handover. For the time threshold corresponding to the SPID, different time thresholds may correspond to different SPIDs, or a same time threshold may be set for the different SPIDs. In some scenarios, if the base station determines that the UE needs to be handed over to a certain target cell according to the SPID of the UE, a time of stay of the UE in a cell, where the UE is located before the UE is handed over to the target cell, may be shorter than the time threshold corresponding to the SPID. At this time, it is also determined that an unnecessary handover occurs in the first cell where the UE is located before the UE is handed over to the target cell. However, because a handover according to the SPID may not be an unnecessary handover, a relatively low time threshold, for example, 0.5 s, may be set for the SPID, so that the base station determines that this type of handover is not unnecessary handover, and therefore it is unnecessary to notify the base station that triggers the handover of the UE to the first cell, thereby reducing a performance penalty and improving service experience of a UE user.

For yet another example, in this embodiment of the present invention, different time thresholds may be set for different QoS. A base station performs determining according to a time threshold corresponding to the QoS when determining whether an unnecessary handover occurs.

Optionally, when the base station is a second base station or a third base station, this embodiment may further include the following:

When it is determined that an unnecessary handover of the UE occurs, the base station sends a notification of occurrence of the unnecessary handover to a base station that triggers the unnecessary handover and that the first cell belongs to.

At this time, when determining, according to a time threshold corresponding to a UE characteristic attribute parameter, that an unnecessary handover of a UE occurs, a base station can notify a base station that triggers the unnecessary handover, that an unnecessary handover of the UE occurs, so that the base station that triggers the unnecessary handover optimizes a handover parameter according to collected information, thereby improving service experience of the UE.

Embodiment 2

Figure 2:
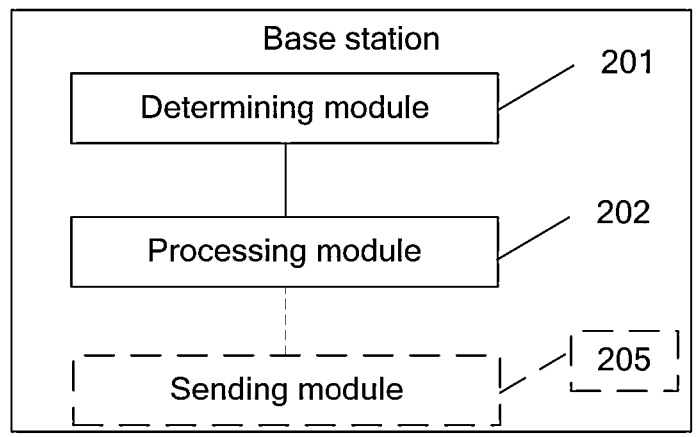
FIG. 2 to FIG. 2e are schematic structural diagrams of base stations according to Embodiment 2 of the present invention.

Accordingly, Embodiment 2 of the present invention provides a base station. The base station may execute a method for determining an unnecessary handover provided by the foregoing embodiment and the following application examples. As shown in FIG. 2, the base station includes a determining module 201 and a processing module 202.

The determining module 201 is configured to determine, if a user equipment UE is handed over from a first cell to a second cell and then handed over from the second cell to a third cell, a time threshold corresponding to a UE characteristic attribute parameter of the UE, and a time of stay of the UE in a second cell.

The processing module 202 is configured to: determine whether an unnecessary handover of the UE occurs according to the time threshold corresponding to the UE characteristic attribute and the time of stay of the UE in the second cell that are determined by the determining module 201; and if the time of stay is shorter than the time threshold, determine that an unnecessary handover of the UE occurs.

The determining module 201 is specifically configured to determine the UE characteristic attribute parameter of the UE, and determine the time threshold according to the determined UE characteristic attribute parameter and a correspondence between a UE characteristic attribute parameter and a time threshold.

Figure 2A:
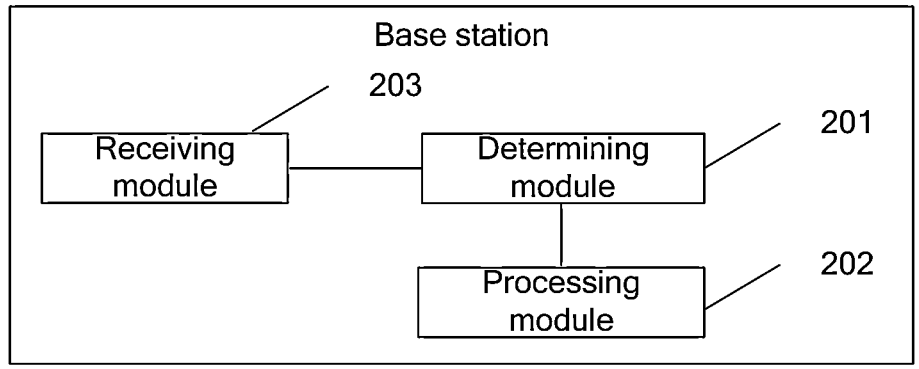

In an implementation manner, optionally, as shown in FIG. 2a, the base station further includes:
a receiving module 203, configured to receive the correspondence between a UE characteristic attribute parameter and a time threshold.

The base station is a base station to which the second cell belongs, and the receiving module 203 is specifically configured to receive the correspondence from a base station that triggers the unnecessary handover and that the first cell belongs to, or configured to receive the correspondence from an upper-layer entity that controls the base station to which the second cell belongs; or the base station is a base station to which the third cell belongs, and the receiving module 203 is specifically configured to receive the correspondence from a base station to which the first cell belongs by using a base station to which the second cell belongs, or configured to receive the correspondence from an upper-layer entity that controls the base station to which the third cell belongs.

Figure 2B:
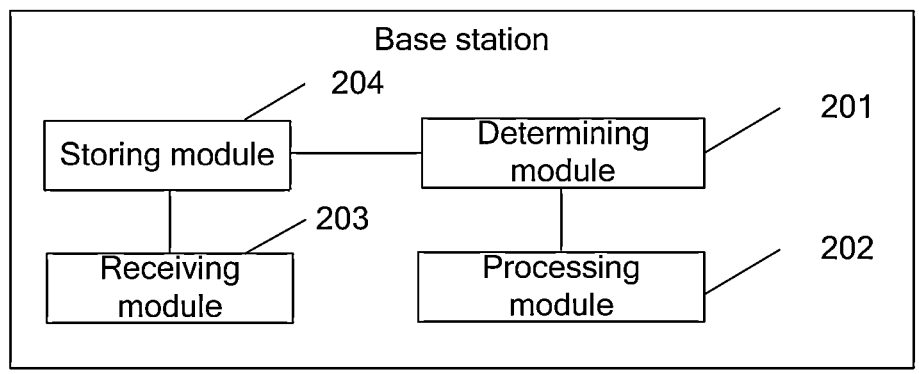

Optionally, as shown in FIG. 2b, the base station further includes:
a storing module 204, configured to store the correspondence, between a UE characteristic attribute parameter and a time threshold, received by the receiving module 203.

Figure 2C:
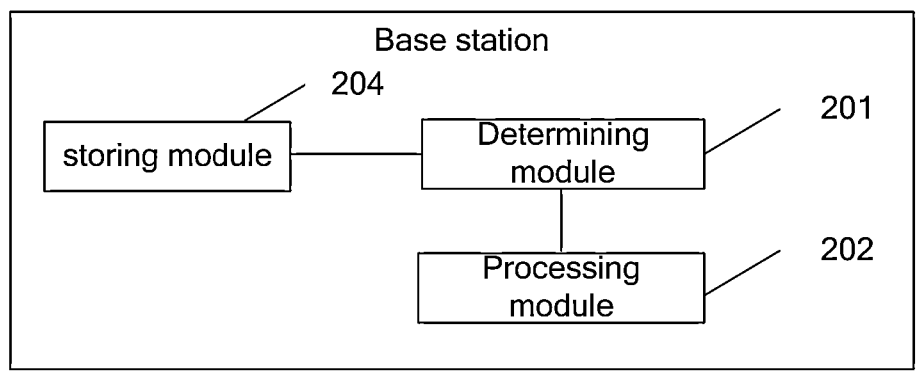

Alternatively, as shown in FIG. 2c, the base station further includes:
a storing module 204, configured to pre-store the correspondence between a UE characteristic attribute parameter and a time threshold.

In this embodiment, if the base station is a base station to which the second cell belongs, the receiving module 203 is specifically configured to receive the correspondence from a base station to which the first cell belongs by using a handover request message; or if the base station is a base station to which the third cell belongs, the receiving module 203 is specifically configured to receive the correspondence from a base station to which the second cell belongs by using a handover request message, where the correspondence is obtained by the base station to which the second cell belongs from a base station to which the first cell belongs.

The receiving module 203 is specifically configured to receive the correspondence by using UE history information of the handover request message.

The base station further includes:
a sending module 205, configured to send, after the processing module 202 determines that an unnecessary handover of the UE occurs, a notification of occurrence of the unnecessary handover to a base station that triggers the unnecessary handover and that the first cell belongs.

In another implementation manner, the base station is a base station to which the first cell belongs.

Figure 2D:
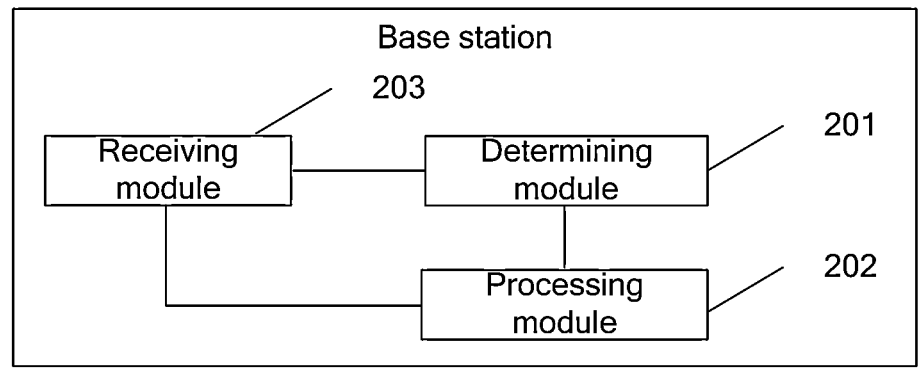

As shown in FIG. 2d, the base station further includes:
a receiving module 203, configured to receive related information sent by a base station to which the second cell belongs or a base station to which the third cell belongs, where the related information includes the time of stay of the UE in the second cell and the UE characteristic attribute parameter of the UE; and the related information is sent when the time of stay of the UE in the second cell is shorter than a default time threshold.

The determining module 201 is specifically configured to determine the time threshold corresponding to the UE characteristic attribute parameter according to the UE characteristic attribute parameter included in the related information that is received by the receiving module 203.

The processing module 202 is specifically configured to determine whether an unnecessary handover of the UE occurs according to the time of stay included in the related information that is received by the receiving module 203 and the determined time threshold.

Figure 2E:
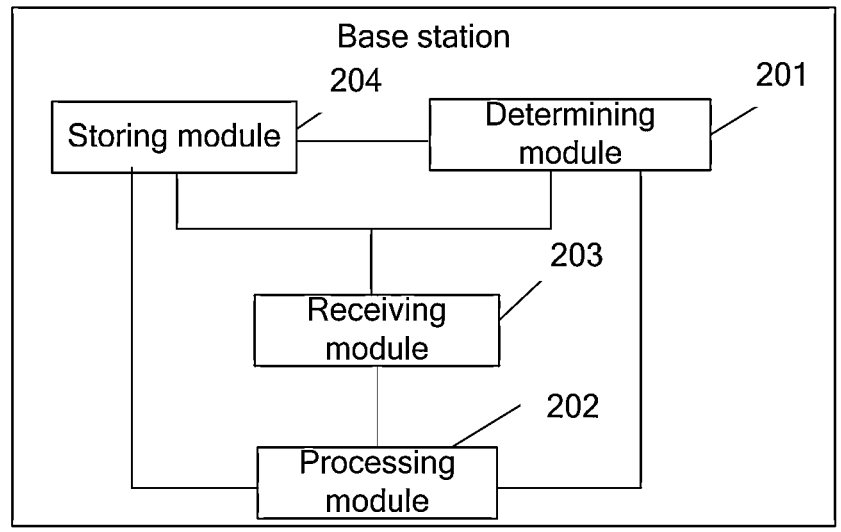

As shown in FIG. 2e, the base station further includes:
a storing module 204, configured to store the correspondence between a UE characteristic attribute parameter and a time threshold. The determining module 201 is specifically configured to determine the time threshold corresponding to the UE characteristic attribute parameter that is included in the related information according to the correspondence, pre-stored by the storing module 204, between a UE characteristic attribute parameter and a time threshold; or The receiving module 203 is further configured to receive the correspondence between a UE characteristic attribute parameter and a time threshold from an upper-level entity of the base station to which the first cell belongs. The determining module 201 is specifically configured to determine the time threshold corresponding to the UE characteristic attribute parameter that is included in the related information according to the correspondence received by the receiving module 203.

The storing module 204 is further configured to store a handover parameter used when the UE is handed over to the second cell.

The processing module 202 is further configured to count unnecessary handovers in an ascending manner, and if the number of the unnecessary handovers within a period exceeds a count threshold, the base station to which the first cell belongs adjusts the handover parameter stored by the storing module 204 to reduce occurrence of the unnecessary handovers; or configured to: count unnecessary handovers in a descending manner, and if the number of the unnecessary handovers within a period is lower than a count threshold, adjust the handover parameter stored by the storing module 204 to reduce occurrence of the unnecessary handovers.

Embodiment 2 of the present invention enables a base station to determine whether an unnecessary handover of a UE occurs according to a time threshold corresponding to a UE characteristic attribute parameter, so as to distinguish different UE characteristic attribute parameters when determining whether an unnecessary handover of the UE occurs, thereby optimizing a method for determining an unnecessary handover.

Optionally, a base station of this embodiment may further include:

a sending module 205, configured to send, after the processing module 202 determines that an unnecessary handover of the UE occurs, a notification of occurrence of the unnecessary handover of the UE to a base station that triggers the unnecessary handover.

At this time, when determining, according to a time threshold corresponding to a UE characteristic attribute parameter, that an unnecessary handover of a UE occurs, a base station can notify a base station that triggers the unnecessary handover, that an unnecessary handover of the UE occurs, so that the base station that triggers the unnecessary handover optimizes a handover parameter according to collected information, thereby improving service experience of the UE.

Embodiment 3

Figure 3:
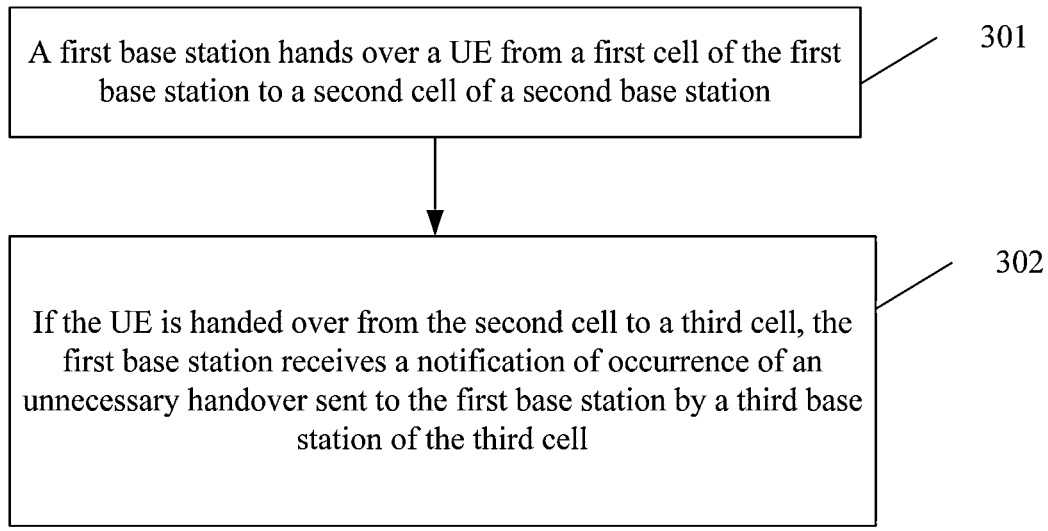
FIG. 3 is a schematic flowchart of a method for determining an unnecessary handover according to Embodiment 3 of the present invention.

Embodiment 3 of the present invention provides a method for determining an unnecessary handover. As shown in FIG. 3, the method includes the following steps:

Step 301: A first base station hands over a user equipment UE from a first cell of the first base station to a second cell of a second base station.

Step 302: If the UE is handed over from the second cell to a third cell, the first base station receives a notification of occurrence of an unnecessary handover sent to the first base station by the second base station or a third base station to which the third cell belongs, where the notification is sent by the second base station or the third base station when a time of stay of the UE in the second cell is shorter than a time threshold corresponding to a UE characteristic feature parameter of the UE.

It should be noted that, in this embodiment, the second base station may be the same as or different from the third base station.

In this embodiment, a UE characteristic attribute parameter includes one or more of a service type, a quality of service QoS requirement of a service, and a subscriber profile ID SPID of a UE.

In addition, before step 301, the method may further include the following:

The first base station sends a correspondence between a UE characteristic attribute parameter and a time threshold to the second base station, or sends a correspondence between a UE characteristic attribute parameter and a time threshold to the third base station, so that the second base station or the third base station determines the time threshold corresponding to the UE characteristic attribute parameter according to the correspondence.

Alternatively, in step 301, the method may further include the following: The first base station sends the correspondence between a UE characteristic attribute parameter and a time threshold to the second base station, so that the second base station acquires the time threshold related to the UE characteristic attribute parameter or so that the second base station sends the correspondence to the third base station.

In this embodiment, in step 301, when the first base station sends the correspondence between a UE characteristic attribute parameter and a time threshold to the second base station, the first base station sends the correspondence to the second base station by using a handover request message.

Preferably, the correspondence is filled in UE history information of the handover request message.

Embodiment 3 of the present invention enables a base station to learn that the base station itself triggers an unnecessary handover, where the unnecessary handover is determined according to a time threshold corresponding to a UE characteristic attribute parameter, thereby optimizing a method for determining an unnecessary handover.

Preferably, this embodiment may further include the following:

Step 303 (not shown in the diagram): The first base station counts unnecessary handovers in an ascending manner, and if the number of the unnecessary handovers within a period exceeds a count threshold, the base station adjusts a handover parameter to reduce occurrence of the unnecessary handovers; or the first base station counts unnecessary handovers in a descending manner, and if the number of the unnecessary handovers within a period is lower than a count threshold, the first base station adjusts a handover parameter to reduce occurrence of the unnecessary handovers.

In this embodiment, because a base station can optimize a handover parameter according to collected information after obtaining a notification of occurrence of an unnecessary handover of a UE, which is determined according to different time thresholds corresponding to different UE characteristic attribute parameters, occurrence of unnecessary handovers is reduced, thereby improving experience of the UE.

Embodiment 4

Figure 4:
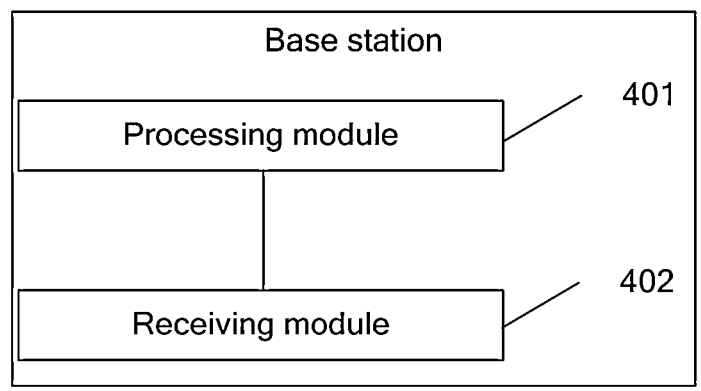
FIG. 4 is a schematic structural diagram of a base station according to Embodiment 4 of the present invention.

Accordingly, Embodiment 4 of the present invention provides a base station. The base station may execute a method for determining an unnecessary handover of any embodiment of the present invention and the following application examples. As shown in FIG. 4, the base station includes a processing module 401 and a receiving module 402.

The processing module 401 is configured to hand over a user equipment UE from a first cell to a second cell by using the receiving module 402.

The receiving module 402 is configured to receive, if the UE is handed over from the second cell to a third cell, a notification of occurrence of an unnecessary handover sent by a base station to which the second cell belongs or a base station to which the third cell belongs, where the notification is sent by the base station to which the second cell belongs or the base station to which the third cell belongs when a time of stay of the UE in the second cell is shorter than a time threshold corresponding to a UE characteristic attribute parameter of the UE.

It should be noted that, in this embodiment, the second base station may be the same as or different from the third base station.

Figure 5:
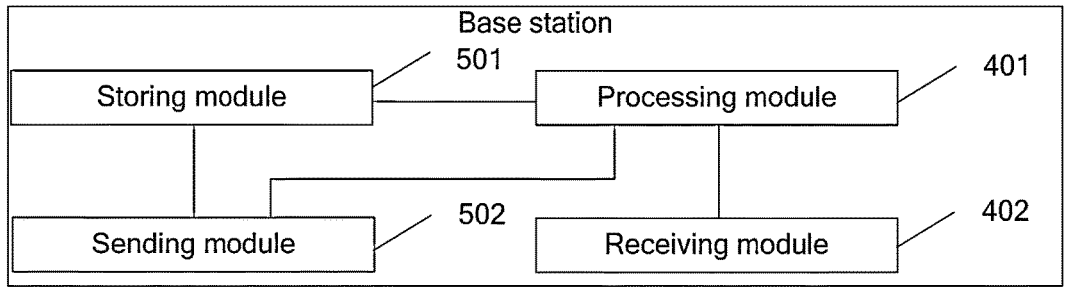
FIG. 5 is a schematic structural diagram of another base station according to Embodiment 4 of the present invention.

In addition, as shown in FIG. 5, a base station of this embodiment may further include: a sending module 501 and a storing module 502.

The storing module 502 is configured to store a correspondence between a UE characteristic attribute parameter and a time threshold.

The sending module 501 is configured to send the correspondence between a UE characteristic attribute parameter and a time threshold to the base station to which the second cell belongs, or send the correspondence between a UE characteristic attribute parameter and a time threshold to the base station to which the third cell belongs, so that the base station to which the second cell belongs or the base station to which the third cell belongs determines the time threshold corresponding to the UE characteristic attribute parameter according to the correspondence.

The sending module 501 is specifically configured to send the correspondence to the second base station by using a handover request message when the processing module 401 hands over the UE from the first cell to the second cell.

The sending module 501 is specifically configured to send the correspondence to the base station to which the second cell belongs by using UE history information of the handover request message.

In addition, the storing module 502 is further configured to store a handover parameter used when the processing module 401 hands over the UE from the first cell to the second cell.

The processing module 401 is further configured to: after the receiving module 501 receives the notification, count the unnecessary handovers in an ascending manner, and if the number of the unnecessary handovers within a period exceeds a count threshold, adjust the handover parameter stored by the storing module 502 to reduce occurrence of the unnecessary handovers; or after the receiving module 501 receives the notification, count the unnecessary handovers in a descending manner, and if the number of the unnecessary handovers within a period is lower than a count threshold, adjust the handover parameter stored by the storing module 502 to reduce occurrence of the unnecessary handovers.

At this time, when determining, according to a time threshold corresponding to a UE characteristic attribute parameter, that an unnecessary handover of a UE occurs, a base station can enable a base station that triggers the unnecessary handover to optimize a handover parameter according to collected information, thereby reducing occurrence of unnecessary handovers and improving experience of the UE.

The following further describes the foregoing embodiments with reference to a specific application scenario and a specific application example. In an application scenario of the following specific application examples, a UE is handed over from cell 1 to cell 2, and then from cell 2 to cell 3, where a base station to which cell 2 belongs may be the same as or different from a base station to which cell 3 belongs. The following uses an example, in which the base station to which cell 2 belongs is different from the base station to which the cell 3 belongs, for description. A base station to which cell 1 belongs is different from the base station to which cell 2 belongs or the base station to which cell 3 belongs. In the following, the base station to which cell 1 belongs is referred to as a source base station, and the base stations to which cell 2 and cell 3 belong are respectively referred to as a first target base station and a second target base station.

It should be noted that, though the following application examples use 3 cells as an example for description, the number of cells is not limited to 3 in the embodiments of the present invention, which may be larger than 3. When there are more cells, a method adopted is the same as that in the embodiments of the present invention.

Application Example 1

Figure 6:
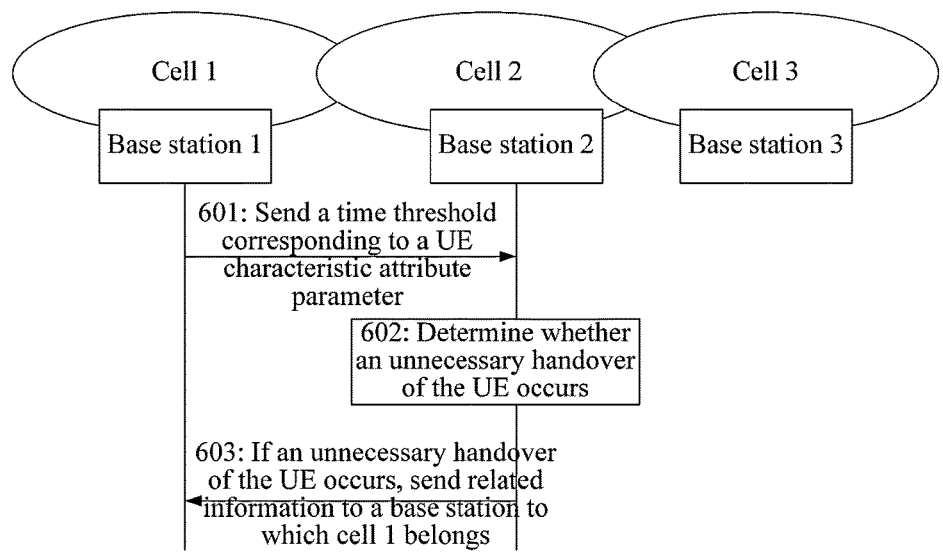
FIG. 6 is a schematic diagram of a method for determining an unnecessary handover according to Application Example 1 of the present invention.

As shown in FIG. 6, this application example includes the following steps:

Step 601: The source base station initiates a handover according to measurement by a UE to hand over the UE to the first target base station, and sends a time threshold corresponding to a UE characteristic attribute parameter to the first target base station during a handover preparation process.

The handover preparation process is a process from reporting of a measurement report by the UE to delivery of a handover command by the source base station.

In this step, the time threshold corresponding to the UE characteristic attribute parameter may be filled in UE history information of a handover request message; or a new information element may be added in the handover request message to indicate the time threshold corresponding to the UE characteristic attribute parameter; or the source base station may send the time threshold corresponding to the UE characteristic attribute parameter to the first target base station in another manner, for example, the source base station sends the time threshold corresponding to the UE characteristic attribute parameter to the UE through an air interface, and the UE sends the time threshold corresponding to the UE characteristic attribute parameter to the first target base station after the UE is handed over to a first target cell.

For the time threshold corresponding to the UE characteristic attribute parameter, reference may be made to the foregoing embodiments, which is not repeatedly described herein.

Step 602: When the first target base station successfully hands over the UE to cell 3, the second target base station determines whether an unnecessary handover of the UE occurs according to the time threshold corresponding to the UE characteristic attribute parameter and received from the source base station.

In this step, when the UE is successfully handed over to cell 3, the second target base station determines whether an unnecessary handover of the UE occurs according to a time of stay of the UE in cell 2 and the time threshold corresponding to the UE characteristic attribute parameter.

In this application example, the second target base station itself can determine the time of stay of the UE in cell 2.

If it is determined that no unnecessary handover occurs in step 602, step 603 is not performed; and if it is determined that an unnecessary handover occurs in step 602, step 603 is performed.

Step 603: The second target base station notifies the source base station of occurrence of an unnecessary handover of the UE.

An unnecessary handover counter is set on the source base station. After the base station learns that an unnecessary handover of the UE occurs, the counter increases or decreases by a unit value, for example 1. When a counter value exceeds a certain threshold or is lower than a certain threshold within a period, the base station to which cell 1 belongs adjusts the handover parameter to reduce occurrence of the unnecessary handovers. For example, the handover parameter is adjusted so that the UE is directly handed over from cell 1 to cell 3, instead of being handed over from cell 1 to cell 2 and then handed over from cell 2 to cell 3.

In this step, the first target base station notifies the source base station of occurrence of the unnecessary handover, and may also send related information to the source base station for reference when the source base station adjusts the handover parameter. The related information may include one or more of a service type of a UE, a SPID of a UE, and QoS.

This application example enables a base station to determine whether an unnecessary handover of a UE occurs according to different time thresholds corresponding to different UE characteristic attribute parameters, so as to distinguish different UE characteristic attribute parameters when determining whether an unnecessary handover of the UE occurs, thereby optimizing a method for determining an unnecessary handover. In addition, when determining, according to a time threshold corresponding to a UE characteristic attribute parameter, that an unnecessary handover of a UE occurs, a base station can notify a base station that triggers the unnecessary handover, that an unnecessary handover of the UE occurs, so that the base station that triggers the unnecessary handover optimizes a handover parameter according to collected information, thereby improving experience of a user of the UE.

Application Example 2

Figure 7:
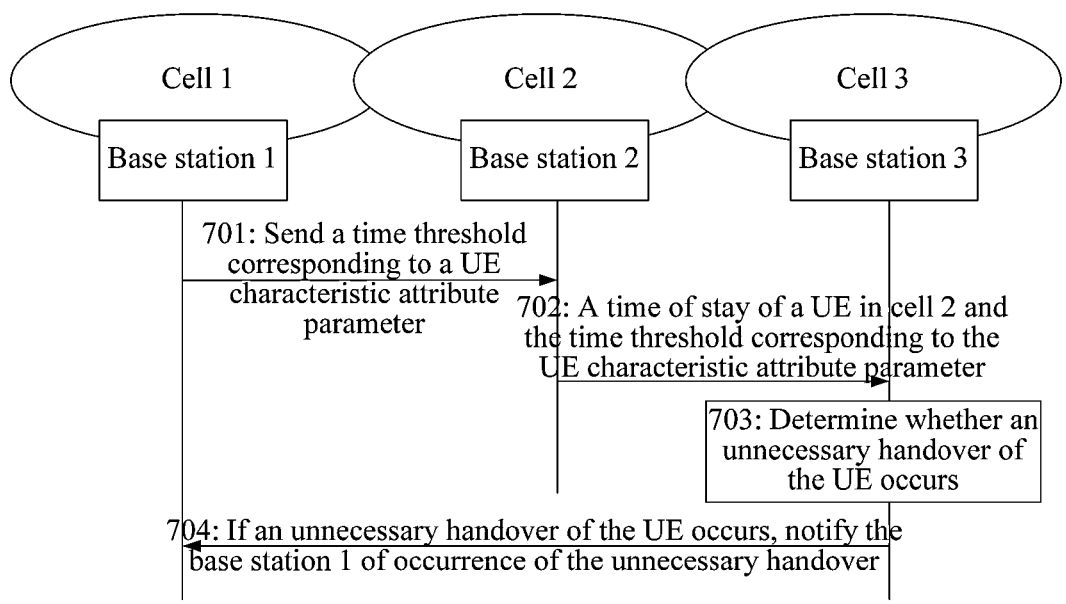
FIG. 7 is a schematic diagram of a method for determining an unnecessary handover according to Application Example 2 of the present invention.

As shown in FIG. 7, this application example includes the following steps:

Step 701 is the same as step 601 in Application Example 1.

Step 702: The UE is handed over from cell 2 to cell 3, and the first target base station sends a time of stay of the UE in cell 2 and the time threshold corresponding to the UE characteristic attribute parameter to the second target base station.

Preferably, the time of stay of the UE in cell 2 and the time threshold corresponding to the UE characteristic attribute parameter may be filled in UE History Information and sent to the second target base station.

Certainly, the time threshold corresponding to the UE characteristic attribute parameter may also be sent to the second target base station in another manner as described in Application Example 1, which is not repeatedly described herein.

Step 703: The second target base station determines whether an unnecessary handover of the UE occurs according to the time of stay the UE in cell 2 and the time threshold corresponding to the UE characteristic attribute parameter. If an unnecessary handover of the UE occurs, step 704 is performed; and if no unnecessary handover of the UE occurs, step 704 is not performed.

In this step, a method for determining whether an unnecessary handover of a UE occurs is the same as that in step 602 of Application Example 1, which is not repeated described herein.

Step 704: The second target base station notifies the source base station of occurrence of an unnecessary handover of the UE.

In this step, because the UE history information of a handover request message includes information about a cell, the second target base station may determine that a base station that triggers the unnecessary handover is the source base station according to the UE history information, so as to notify the source base station that an unnecessary handover of the UE occurs.

Processing after the source base station learns that an unnecessary handover of the UE occurs is the same as that in the foregoing application example, which is not repeatedly described herein.

The second target base station may send related information to the source base station through an interface between base stations, or forward the related information by using a core network entity.

This application example enables a base station to determine whether an unnecessary handover of a UE occurs according to different time thresholds corresponding to different UE characteristic attribute parameters, so as to distinguish different UE characteristic attribute parameters when determining whether an unnecessary handover of the UE occurs, thereby optimizing a method for determining an unnecessary handover. In addition, when determining, according to a time threshold corresponding to a UE characteristic attribute parameter, that an unnecessary handover of a UE occurs, a base station can notify a base station that triggers the unnecessary handover, that an unnecessary handover of the UE occurs, so that the base station that triggers the unnecessary handover optimizes a handover parameter according to collected information, thereby improving experience of a user of the UE.

Application Example 3

Step 1: An upper-level entity that controls a base station configures a time threshold corresponding to a UE characteristic attribute parameter on every base station that belongs to the upper-level entity.

The upper-level entity in this step may be an operation, administration and maintenance (OAM) entity, or a mobility management entity (MME), or the like.

An upper-level entity may send a time threshold corresponding to a UE characteristic attribute parameter to a base station through an interface between the upper-layer entity and the base station. The time threshold corresponding to the UE characteristic attribute parameter is the same as that described in the foregoing embodiments, which is not repeatedly described herein.

In this application example, a base station may learn a UE characteristic attribute parameter directly according to a UE, so as to obtain a corresponding time threshold according to the UE characteristic attribute parameter. Other steps of this application example may be the same as those of Application Example 1 or Application Example 2; that is, the base station to which cell 2 belongs or the base station to which cell 3 belongs determines whether an fast handover of a UE occurs. A difference from the foregoing application examples is that a base station in this application example does not need to send a correspondence to other base stations. For a specific operation manner, reference may be made to the foregoing application examples, which is not repeatedly described herein.

It should be noted that, a technical effect brought by this application example is the same as those of Application Example 1 and Application Example 2. For specific content, reference may be made to descriptions of Application Example 1 and Application Example 2, which is not repeatedly described herein.

Application Example 4

Figure 8:
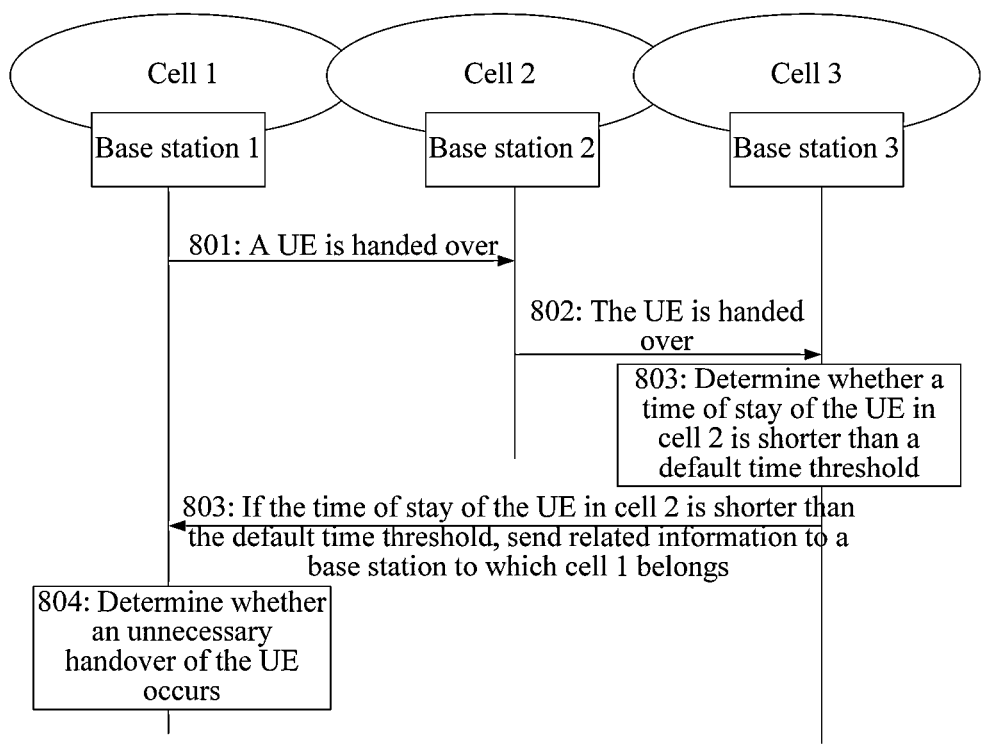
FIG. 8 is a schematic flowchart of a method for determining an unnecessary handover according to Application Example 3 of the present invention.

As shown in FIG. 8, this application example includes the following steps:

Step 801: A UE is handed over from cell 1 to cell 2;

Step 802: The UE is handed over from cell 2 to cell 3, where the base station to which cell 2 belongs fills a time of stay of the UE in cell 2 in UE History Information and sends to the base station to which cell 3 belongs.

Step 803: If the base station to which cell 3 belongs detects that the time of stay of the UE in cell 2 is shorter than a default time threshold, then the base station to which cell 3 belongs sends related information to the base station to which cell 1 belongs, where the related information includes the time of stay of the UE in cell 2 and a UE characteristic attribute parameter.

It should be noted that, this step may also be that, the base station to which cell 2 belongs determines whether the time of stay of the UE in cell 2 is shorter than a fixed time threshold configured, on the base station, for all services and UEs after the base station to which cell 2 belongs successfully hands over the UE to cell 3. If the time of stay of the UE in cell 2 is shorter than the fixed time threshold configured, on the base station, for all services and UEs, the base station to which cell 2 belongs sends the related information to the base station to which cell 1 belongs.

In this application example, in step 801 and step 802, the base station to which cell 1 belongs does not need to send the time threshold corresponding to the UE characteristic attribute parameter to the base station to which cell 2 belongs, and the base station to which cell 2 belongs does not need to send the time threshold corresponding to the UE characteristic attribute parameter to the base station to which cell 3 belongs. At this time, the base station to which cell 3 belongs or the base station to which cell 2 belongs feeds back to the base station to which cell 1 belongs according to the default time threshold (that is, the fixed time threshold configured, on the base station, for all services and UEs), for example, 2 s. For example, if the time of stay of the UE in cell 2 is shorter than the default time threshold 2 s, then the base station to which cell 3 belongs feeds back the related information to the base station to which cell 1 belongs, where the related information includes the time of stay of the UE in cell 2, and may further include one or more of a service type of a UE, an SPID and QoS.

Step 804: After receiving the related information, the base station to which cell 1 belongs determines whether an unnecessary handover of the UE occurs according to the time threshold corresponding to the UE characteristic attribute parameter of the base station to which cell 1 belongs itself and the time of stay of the UE in cell 2.

For processing after the base station to which to cell 1 belongs determines that an unnecessary handover occurs, reference may be made to the foregoing application examples, which is not repeatedly described herein.

An effect that can be achieved by this application example is the same as those of the foregoing application examples, which is not repeatedly described herein.

It should be noted that, the methods of the embodiments of the present invention are applicable to networks with any standards. For example, Global System for Mobile Communications (GSM), Universal Mobile Telecommunications System (UMTS), and Long Term Evolution (LTE). Correspondingly, base stations in different network systems may be named differently. For example, the base station in the embodiments of the present invention may be a base station (BTS) in GSM, may also be a radio network controller (RNC) in UMTS, and may further be an evolved NodeB (eNB) in LTE. The base station in the embodiments of the present invention is a general collection of base stations with same or similar functions in all network standards.

It should be noted that, in the foregoing implementation manners of the base station, division of functional modules is merely used as an example, and the foregoing functions may be assigned to different functional modules according to an actual need, for example, according to a corresponding hardware configuration requirement or for ease of software implementation; that is, an internal structure of the base station is divided into different functional modules, to complete all or apart of the functions described above. Moreover, in an actual application, the corresponding modules in the embodiments may be realized by corresponding hardware, or may be completed by corresponding hardware by implementing corresponding software; for example, the foregoing receiving module and sending module may be hardware that has a function of implementing the foregoing receiving module and sending module, for example, a receiver, a transmitter or a transceiver, or may be a universal processor or another hardware device that can execute a corresponding computer program to complete the foregoing functions; for another example, the foregoing processing module may be hardware that has a function of implementing the foregoing processing module, such as a processor, or another hardware device that is capable of implementing a corresponding computer program and thereby completing the foregoing functions; for still another example, the foregoing storing module may be hardware that has a function of implementing the functions of the foregoing storing module, for example, a memory. (The principle of the foregoing description may be applicable to each embodiment provided in this specification).

It should be noted that, information exchange between modules/units of the foregoing base station, execution procedures, and the like are based on the idea of the method embodiments of the present invention, and technical effects thereof are the same as the embodiments of the present invention. For details, reference may be made to descriptions of method embodiments of the present invention, and details are not described herein again.

Persons of ordinary skill in the art may understand that all or a part of the steps of the methods in the embodiments may be implemented by a program instructing relevant hardware. The program may be stored in a computer readable storage medium. The storage medium may include: a read-only memory (ROM), a random access memory (RAM), a magnetic disk, or an optical disc.

The foregoing describes in detail a method for determining an unnecessary handover and a base station provided by embodiments of the present invention. Specific examples are used in the specification to describe the principle and implementations of the present invention. The descriptions of the foregoing embodiments are merely intended to help understand the method and idea of the present invention. In addition, with respect to the implementations and the application scope, modifications may be made by persons of ordinary skill in the art according to the idea of the present invention. For example, the present invention does not limit the foregoing UE characteristic attribute parameter to one or more of a service type, QoS of a service and an SPID of a UE, which may also be another UE characteristic attribute parameter. Therefore, the specification shall not be construed as a limitation on the present invention.

What is claimed is:

1. A method for determining an unnecessary handover, the method comprising:
   in response to a user equipment (UE) being handed over from a first cell to a second cell and then handed over from the second cell to a third cell:
   receiving, by a first base station, related information from a second base station that serves the second cell or from a third base station that serves the third cell, wherein the related information comprises a stay time of a user equipment (UE) in the second cell and a UE characteristic attribute parameter of the UE, and the related information is sent by the second base station or the third base station when the stay time of the UE in the second cell is shorter than a default time threshold,
   determining, by the first base station, a time threshold corresponding to the UE characteristic attribute parameter of the UE, and
   determining, by the first base station, that an unnecessary handover of the UE occurs according to the stay time comprised in the related information and the determined time threshold when the stay time of the UE in the second cell is shorter than the time threshold;

wherein the UE characteristic attribute parameter comprises at least one of a service type, a quality of service (QoS) parameter of a service, and a subscriber profile ID (SPID) of the UE.

2. The method according to claim 1, wherein determining the time threshold comprises:
determining, by the first base station, the time threshold according to the UE characteristic attribute parameter and a correspondence between the UE characteristic attribute parameter and the time threshold.

3. The method according to claim 2, wherein:
the correspondence is preset in the first base station.

4. The method according to claim 2, further comprising:
sending, by the first base station, to the second base station, the correspondence, wherein the first base station triggers the unnecessary handover.

5. The method according to claim 4, wherein:
sending the correspondence comprises:
sending, by the first base station through a handover request message, the correspondence to the second base station.

6. The method according to claim 1, wherein determining the time threshold comprises:
determining, by the first base station, the time threshold corresponding to the UE characteristic attribute parameter that is comprised in the related information according to a pre-stored correspondence between the UE characteristic attribute parameter and the time threshold; or
receiving, by the first base station, from an upper-level entity of the first base station, a correspondence between the UE characteristic attribute parameter and the time threshold, and determining, according to the received correspondence, the time threshold corresponding to the UE characteristic attribute parameter that is comprised in the related information.

7. The method according to claim 1, after determining that an unnecessary handover of the UE occurs, the method further comprises:
counting, by the first base station, unnecessary handovers in an increasing manner, and
when the number of the unnecessary handovers within a period exceeds a count threshold, adjusting, by the first base station, a handover parameter to reduce occurrence of the unnecessary handovers; or
counting, by the first base station, unnecessary handovers in an decreasing manner, and
when the number of the unnecessary handovers within a period is lower than a count threshold, adjusting, by the first base station, a handover parameter to reduce occurrence of the unnecessary handovers.

8. A base station, which is a first base station that serves a first cell, the first base station comprising:
a receiver, a processor, and a transmitter, the receiver and the transmitter are coupled with the processor, wherein:
in response to a user equipment (UE) being handed over from the first cell to a second cell and then handed over from the second cell to a third cell:
the receiver is configured to:
receive related information from a second base station that serves the second cell or a third base station that serves the third cell, wherein the related information comprises a stay time of a user equipment (UE) in the second cell and a UE characteristic attribute parameter of the UE, and the related information is sent when the stay time of the UE in the second cell is shorter than a default time threshold;
the processor is configured to:
determine a time threshold corresponding to a UE characteristic attribute parameter of the UE, and
determine that an unnecessary handover of the UE occurs according to the stay time comprised in the related information and the determined time threshold when the stay time of the UE in the second cell is shorter than the time threshold;
wherein the UE characteristic attribute parameter comprises at least one of a service type, a quality of service (QoS) parameter of a service, and a subscriber profile ID (SPID) of the UE.

9. The base station according to claim 8, wherein
the processor is further configured to determine the time threshold as follows:
determine the time threshold according to the UE characteristic attribute parameter from a correspondence between the UE characteristic attribute parameter and the time threshold.

10. The base station according to claim 9, wherein:
the transmitter is configured to:
send to the second base station the correspondence, wherein the first base station triggers the unnecessary handover.

11. The base station according to claim 9, further comprising:
a memory, configured to pre-store the correspondence between the UE characteristic attribute parameter and the time threshold.

12. The base station according to claim 10, wherein:
the correspondence is sent by using a handover request message.

13. The base station according to claim 8, wherein:
the processor is further configured to determine the time threshold as follows:
determine the time threshold corresponding to the UE characteristic attribute parameter that is comprised in the related information according to a pre-stored correspondence between the UE characteristic attribute parameter and the time threshold; or
the receiver is further configured to receive a correspondence between the UE characteristic attribute parameter and the time threshold from an upper-level entity of a base station to which the first cell belongs, and the processor is further configured to determine the time threshold as follows:
determine the time threshold corresponding to the UE characteristic attribute parameter that is comprised in the related information according to the received correspondence.

14. The base station according to claim 8, further comprising:
a memory, configured to store a handover parameter used when the UE is handed over to the second cell; and
the processor is further configured to:
count unnecessary handovers in an increasing manner, and
when the number of the unnecessary handovers within a period exceeds a count threshold, adjust the handover parameter to reduce occurrence of the unnecessary handovers; or
count unnecessary handovers in a decreasing manner, and when the number of the unnecessary handovers within a period is lower than a count threshold, adjust the handover parameter to reduce occurrence of the unnecessary handovers.

* * * * *